United States Patent
Kwon

(10) Patent No.: US 12,398,306 B2
(45) Date of Patent: Aug. 26, 2025

(54) WATERPROOFING METHOD USING ACRYLIC MATERIAL

(71) Applicant: MADE WATERPROOF INC., Daegu (KR)

(72) Inventor: Sang Hong Kwon, Daegu (KR)

(73) Assignee: MADE WATERPROOF INC., Daegu (KR)

( * ) Notice: Subject to any disclaimer, the term of this patent is extended or adjusted under 35 U.S.C. 154(b) by 474 days.

(21) Appl. No.: 17/801,129

(22) PCT Filed: Nov. 16, 2020

(86) PCT No.: PCT/KR2020/016109
§ 371 (c)(1),
(2) Date: Aug. 19, 2022

(87) PCT Pub. No.: WO2021/167207
PCT Pub. Date: Aug. 26, 2021

(65) Prior Publication Data
US 2023/0098072 A1 Mar. 30, 2023

(30) Foreign Application Priority Data
Feb. 20, 2020 (KR) .................. 10-2020-0021306

(51) Int. Cl.
*C09K 3/12* (2006.01)
(52) U.S. Cl.
CPC ..................... *C09K 3/12* (2013.01)
(58) Field of Classification Search
CPC ..... C09K 3/12; C04B 41/483; C04B 2111/72; E04G 23/0211
See application file for complete search history.

(56) References Cited

U.S. PATENT DOCUMENTS 5,253,957 A   10/1993   Fujikawa

FOREIGN PATENT DOCUMENTS

| JP | 05-247958 A | 9/1993 |
| JP | 2003-176699 A | 6/2003 |

(Continued)

OTHER PUBLICATIONS

SealBoss Mechanical Packers: Industry Leading Selection, SealBoss Concrete Solutions (https://www.sealboss.com/PACKER.php, last visited Jan. 22, 2025). (Year: 2023).*

(Continued)

*Primary Examiner* — William P Fletcher, III
(74) *Attorney, Agent, or Firm* — Francis J. Maguire; WARE FRESSOLA MAGUIRE & BARBER LLP

(57) ABSTRACT

Provided is a waterproofing method using an acrylic injection material, more particularly, the method including confirming a crack site; perforating a plurality of injection holes from an upper part of the crack site; installing packers in the perforated injection holes; filling the crack site by injecting a two-liquid type acrylic injection material into the packers installed in the injection holes; and removing the installed packers. According to the waterproofing method using an acrylic injection material according to the present invention, crack sites can be efficiently repaired on the roof, underground parking lot, or upper part of a toilet, and so the waterproofing method has excellent waterproofing efficiency, and excellent construction convenience and durability.

2 Claims, 1 Drawing Sheet

(56) References Cited

FOREIGN PATENT DOCUMENTS

| KR | 100948348 B1 | * | 3/2010 |
| KR | 101590345 B1 | * | 2/2016 |
| KR | 101591903 B1 | * | 2/2016 |
| KR | 10-2017-0091251 A | | 8/2017 |
| KR | 101852333 B1 | * | 4/2018 |
| KR | 10-2159233 B1 | | 9/2020 |

OTHER PUBLICATIONS

Pulviplume, Oxford English Dictionary, http://oed.com/dictionary/pulviplume_n?tl=true (last visited Jan. 22, 2025). (Year: 2025).*
Perforating, Merriam-Webster, http://merriam-webster.com/dictionary/perforate (last visited Jan. 22, 2025). (Year: 2025).*
"Silane Coupling Agents: Combination of Organic and Inorganic Materials" by ShinEtsu (2017). (Year: 2017).*
English Translation of the Internatinal Search Report (ISR) for International Application No. PCT/KR2020/016109, mailed Mar. 24, 2021, 3 pages.

* cited by examiner

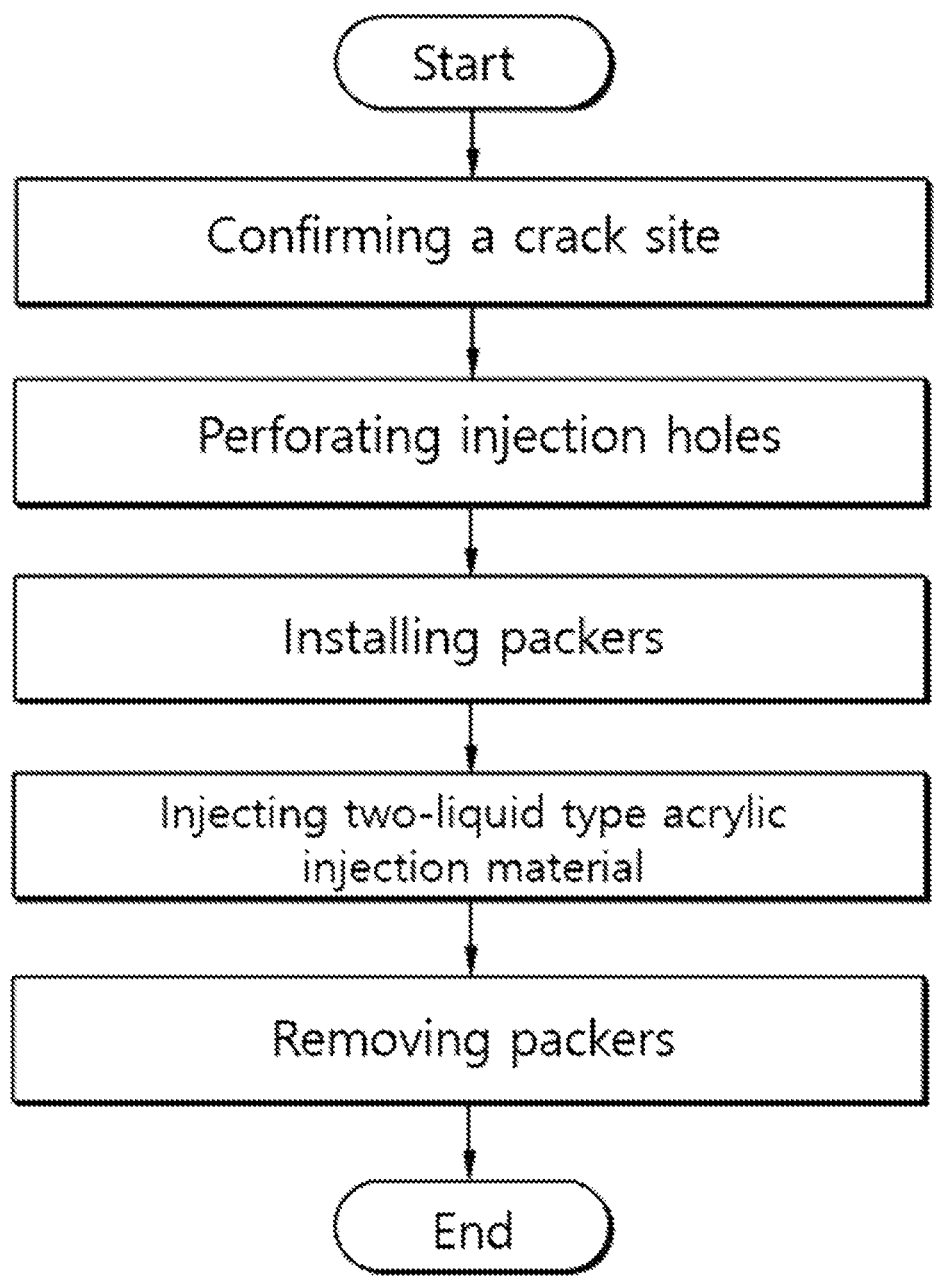

WATERPROOFING METHOD USING ACRYLIC MATERIAL

TECHNICAL FIELD

The present invention relates to a waterproofing method using an acrylic injection material, and more particularly, a waterproofing method by perforating a leaking site or a cracking site on a roof, underground parking lot, toilet and the like and injecting an acrylic waterproofing material therein, the waterproofing method having excellent waterproofness, durability, construction convenience and the like.

BACKGROUND ART

Generally, buildings such as concrete structures undergo leaks and condensation due to cracks over time, and so the durability is weakened and thus the aging is accelerated. In particular, as buildings have grown in size recently, many flat roofs are being constructed, but flat roofs have a high possibility of leakage, because rain water is easily collected due to the structure.

Therefore, waterproofing construction is considered essential to prevent leakage of building roof slabs, underground parking lots, toilets and the like. In this regard, the waterproof construction methods that are widely used at present include a coating waterproofing method for coating a liquid waterproofing material, a sheet waterproofing method for constructing a sheet-formed waterproofing material (waterproofing sheet) as if wall-papering, and a composite waterproofing method that is implemented by combining the coating waterproofing method and the sheet waterproofing method However, despite the waterproofing construction, aging of concrete occurs on the roof or underground parking lot, causing cracks and damaged sites and thereby resulting in leakage in the rainy season. Such rainwater infiltrates into the concrete and freezes in winter, and when the ice is melted by the weather, contraction and expansion occurs to make cracks grow and gradually expand in the concrete, causing a big problem.

When such leakage occurs, in order to solve the same, a method of re-applying a liquid waterproofing material to the leaking site, or removing the waterproofing sheet and re-constructing it has been used. In addition, when non-exposed waterproofing was implemented as one of the waterproofing sheet construction methods, after the entire subsidiary material layer around the leaking site was removed by excavation, a waterproofing solution was applied, and then the subsidiary material layer was placed again.

However, this method has disadvantages that the crack sites on roofs, underground parking lots, toilets and the like are not sufficiently repaired to improve waterproofness and that the efficiency is low because unnecessary parts should also be reconstructed.

PRIOR ARTS

Cited Document (CITED DOCUMENT D1) KR 10-1892997 B1

DETAILED DESCRIPTION OF THE INVENTION

Technical Problem

Therefore, the purpose of the present invention is to provide a waterproofing method using an acrylic injection material, wherein the waterproofing method is performed by perforating a leaking site or a cracking site on roofs, underground parking lots, toilets and the like and injecting an acrylic waterproofing material therein for efficient waterproofing and wherein the waterproofing method has excellent waterproofness, durability, construction convenience and the like.

Technical Solution

To accomplish the purpose described above, the waterproofing method using an acrylic injection material of the present invention comprises confirming a crack site; perforating a plurality of injection holes from an upper part of the crack site; installing packers in the perforated injection holes; filling the crack site by injecting a two-liquid type acrylic injection material into the packers installed in the injection holes; and removing the installed packers.

The two-liquid acrylic injection material consists of a first liquid containing a crosslinked product prepared by crosslinking acrylic acid metal salts with a non-expandable epoxy acrylate resin; and a second liquid containing a persulfate compound, phosphate, and water, wherein the first liquid and the second liquid are mixed and injected at a ratio of 1:0.5 to 1 by weight.

The method further comprises applying an acrylic putty material to a crack site from which the packer is removed, wherein the acrylic putty material comprises 1 to 1.5% by weight of titanium oxide, 1 to 3% by weight of trimethyl-2,4-pentanediol-1,3-isobutylate, 1 to 3% by weight of ethylene glycol, 1 to 5% by weight of a silane coupling agent, 25 to 30% by weight of calcium carbonate, 30 to 40% by weight of acrylic emulsion, 1 to 5% by weight of graphene, and the balance of water.

The method further comprises, after the applying an acrylic putty material, applying a surface material to an entire slab in which the crack site is waterproofed, wherein the surface material comprises alkoxysilanes, colloidal silica, formic acid and isopropyl alcohol.

The surface material further comprises duck down powder, carbon white and guanidine phosphate.

The first liquid further comprises duck down powder.

Advantageous Effects

According to the waterproofing method using an acrylic injection material according to the present invention, crack sites can be efficiently repaired on the roof, underground parking lot, or upper part of a toilet, and so the waterproofing method has excellent waterproofing efficiency, and excellent construction convenience and durability.

DESCRIPTION OF THE DRAWINGS

The sole FIGURE is a flowchart illustrating the waterproofing method according to the present invention.

DETAILED DESCRIPTION OF EMBODIMENTS

Hereinafter, the present invention is described in detail with reference to the attached drawing.

Conventional methods of waterproofing roofs, underground parking lots and toilets have disadvantages in that they are vulnerable to cracks of concrete, have difficulties in construction, and have difficulties in construction and repair.

Therefore, the biggest feature of the present invention is that a conventional method of injecting a water-repellent material, which is used in the wall crack repair method, is applied to waterproofing of roofs, underground parking lots and toilets so that the works can be performed from the upper part. Therefore, the waterproofing method has advantages of excellent construction convenience, excellent waterproofness and durability of crack sites, and easy repair.

As shown in the FIGURE, the waterproofing method according to the present invention comprises confirming a crack site on roofs, underground parking lots, toilets and the like; perforating one or more injection holes from an upper part of the confirmed crack site; installing packers in the perforated injection holes; filling the crack site by injecting a two-liquid type acrylic injection material into the packers installed in the injection holes; and removing the installed packers.

Hereinafter, this will be described step by step with reference to the FIGURE.

Confirming a Crack Site on Roofs, Underground Parking Lots or toilets

First, a crack site is confirmed and arranged by removing substances around the crack site. This is because the crack site leads to leakage.

Perforating a Plurality of Injection Holes from an Upper Part of the Crack Site

Next, one or more injection holes are perforated from an upper part of the confirmed crack site. At this time, the injection hole, which is for injection of a two-component acrylic injection material, is perforated in consideration of the width, depth, etc. of the crack site. Although the size, depth, interval, width, etc. are not limited, for example, the injection hole may be performed in an interval of about 50 to 200 cm along the crack site, and the depth may be 5 to 40 cm and the width may be about 3 to 20 mm but are not limited to these.

Installing Packers in the Perforated Injection Holes

Next, a packer, which is an injection means, is installed in the perforated injection hole. The packer is conventionally used for injection of a water-repellent agent for walls, and the type, size, etc. are not limited, and the installation method is also according to a known method.

Filling the Crack Site of a Roof Slab by Injecting a Two-Liquid Type Acrylic Injection Material into the Packers Installed in the Injection Holes Next, a two-liquid type acrylic injection material is injected into the packer installed in the injection hole to fill the crack site, thereby imparting waterproofness. At this time, the injection pressure is not limited.

In the present invention, the two-liquid type acrylic injection material may be any of commercially available products, but, to be sufficiently filled in the crack site to ensure excellent waterproofness, a product that is not cured quickly may preferably be used. For example, DH acrylic seal of Daehwa Precision may be used. However, when DH acrylic seal of Daehwa Precision is used, to delay the curing time, agent A and agent B of the DH acrylic seal may preferably be mixed and used at a ratio of about 1:0.5 to 0.8 by weight, not a ratio of 1:1 by weight.

In addition, the two-liquid type acrylic injection material may consist of a first liquid containing a crosslinked product prepared by crosslinking acrylic acid metal salts with a non-expandable epoxy acrylate resin; and a second liquid containing a persulfate compound, phosphate, and water, wherein the first liquid and the second liquid are mixed and used at a ratio of 1:0.5 to 1 by weight. When the acrylic injection material is used, the waterproofness, durability and the like are more excellent. This will be described in more detail below.

Removing the Installed Packers

Next, the installed packer is removed. At this time, the removal method is according to the method disclosed in the prior art.

In addition, the acrylic injection material is cured at room temperature for 24 hours to prevent leakage at the crack site and finish roof waterproofing.

However, for perfect waterproofing of the cracked site, the method may further comprise applying, before curing, an acrylic putty material to the cracked site from which the packer is removed. At this time, the applying method and thickness are not limited.

Therefore, when the acrylic putty material is further applied to the cracked site, crack follow-up performance can be further increased, and the waterproofness and durability are further improved, reducing the repair cost.

In addition, it is also possible that only about 70 to 90% of the depth of the injection hole is filled with the two-component acrylic injection material, and the remaining injection hole is filled with an acrylic putty material.

As the acrylic putty material, a composition comprising 1 to 1.5% by weight of titanium oxide, 1 to 3% by weight of trimethyl-2,4-pentanediol-1,3-isobutylate, 1 to 3% by weight of ethylene glycol, 1 to 5% by weight of a silane coupling agent, 25 to 30% by weight of calcium carbonate, 30 to 40% by weight of acrylic emulsion, 1 to 5% by weight of graphene, and the balance of water can be used.

Here, the graphene refers to a single layer separated from graphite which has a layered structure in which hundreds of thousands to millions or more of layers are stacked by van der Waals force, etc., but in the present application, the graphene included in a graphene composite organic solution may be several to several tens of layers of graphite (similar graphene).

The graphene contained in the organic solution may be such a single layer of graphite or several to several tens of layers of graphite (pseudo-graphene). Therefore, when an acrylic putty material comprising the graphene is additionally applied, waterproofness, durability, fouling resistance and the like are improved.

In addition, for waterproof construction of an entire surface of roof, underground parking lot and toilet, rather than waterproofing of only a cracked site, after the removing the packers or applying an acrylic putty material, the method may further comprise applying a surface material to an entire surface in which the crack site is waterproofed. The applying method and applying thickness of the surface material are not limited, and for example, about 100 to 5,000 μm is sufficient.

At that time, the surface material comprises alkoxysilanes, colloidal silica, formic acid and isopropyl alcohol.

Here, as the alkoxysilanes, a mixture of 70 to 90 mol % of methyl trimethoxy silane and 10 to 30 mol % of 3-glycidoxy propyl trimethoxy silane is used. This is for adhesion, corrosion resistance and the like.

The colloidal silica is in a solution phase, and may be a 10 to 20 μm ultrafine colloidal solution containing 0.1 to 0.5% by weight of sodium salt and other water, colloid-forming substances and pH adjusting substances, and a solution having a pH of 8.5 and a solid matter content of 28 to 32% by weight. The colloidal silica may function outside the concentration of the component, but may exhibit an optimal effect within the concentration range.

The formic acid is used to form a ceramic polymer through dehydration and dealcoholization of alkoxysilanes.

The composition described above can be solated in an alcohol solvent, particularly isopropyl alcohol solvent, and the sol forms coating film through gelation.

The surface material comprises 37 to 43% by weight of alkoxysilanes, 25 to 29% by weight of colloidal silica, 0.32 to 0.36% by weight of formic acid, and the balance isopropyl alcohol to secure excellent waterproofness, strength, and fouling resistance.

In addition, the surface material may further comprise duck down powder, carbon white, and guanidine phosphate each in a range of 1 to 2% by weight, and the duck down powder is intended to significantly increase tensile strength, corrosion resistance and waterproofness. Dried duck down can be pulverized to a particle size of 10 to 500 nm to be used. The carbon white is precipitated silica prepared by using sodium silicate as a raw material. The carbon white having a particle size of about 200 to 325 mesh is used, and plays the role of improving abrasion resistance and strength. The guandinine phosphate is used to improve initial adhesion.

In addition, the duck down powder may be in a state in which the surface is coated with a coating solution containing an ester-based lubricant and a nonionic surfactant. This is for the improvement of dispersibility and adhesion, and the coating amount of the coating solution is preferably 0.5 to 1% by weight of the coating solution to 99 to 99.5% by weight of the duck down powder. However, in the present invention, the coating amount of the coating solution is not particularly limited, and is only a preferable example. In addition, as the coating solution, a coating solution consisting of 40 to 50% by weight of a polyhydric alcohol ester lubricant and 50 to 60% by weight of a nonionic surfactant may be used.

In the present invention, in the method for preparing the surface material, two types of alkoxysilanes are mixed, and formic acid is separately added to colloidal silica to mix. Then, the resulting two mixtures are subject to a reaction, and isopropyl alcohol is added thereto to dissolve, thereby preparing a surface material containing colloidal silica-silane sol. At this time, the reaction temperature of the two mixtures rises to 65-75° C. due to spontaneous heat release, and a total reaction time of 10 to 14 hours is sufficient.

In addition, the duck down powder, carbon white and guandinine phosphate may be added together when the isopropyl alcohol is added.

In the surface material, a ring-opening reaction of GPTMS is facilitated by the formic acid, and polymerization into the form of oligomers occurs through dehydration and dealcoholization of alkoxysilanes to gradually form a ceramic polymer According to the method as described above, it is possible to not only effectively waterproof crack sites of roofs, underground parking lots or toilets but also increase the overall waterproofness of roofs, underground parking lots or toilets, improve crack follow-up performance, durability and the like, and maintain the waterproof effect for a long time, reducing the repair cost and performing the repair easily.

Hereinafter, the two-liquid type acrylic injection material used in the present invention will be described in detail.

The two-liquid acrylic injection material according to the present invention consists of a first liquid containing a crosslinked product prepared by crosslinking acrylic acid metal salts with a non-expandable epoxy acrylate resin; and a second liquid containing a persulfate compound, phosphate, and water.

First, the first liquid is prepared by preparing an aqueous solution of acrylic acid metal salts by adding acrylic acid, methacrylic acid, or both to an aqueous solution of a metal hydroxide such as potassium or magnesium, and then adding a non-expandable epoxy acrylate resin to the resulting aqueous solution to produce a crosslinked product.

Specifically, the crosslinked production is prepared by synthesizing an aqueous solution of acrylic acid metal salts by dropping and neutralizing each of acrylic acid and methacrylic acid or a mixture thereof to a single or mixed aqueous solution of a monovalent metal hydroxide, such as lithium hydroxide, potassium hydroxide and sodium hydroxide, and a divalent metal hydroxide, such as magnesium hydroxide and calcium hydroxide, and then crosslinking the resulting an aqueous solution of acrylic acid metal salts with a non-expandable epoxy acrylate resin. As the non-expandable epoxy acrylate resin, trimethylolpropane triacrylate may be used.

At this time, the concentration of the metal acrylic acid salts in the aqueous solution of the acrylic acid metal salts may preferably be 20 to 30% by weight to slow down the curing rate so that the injection material can sufficiently penetrate into the crack site. In addition, the mixing ratio of the aqueous solution of the acrylic acid metal salts and the non-expandable epoxy acrylate resin may preferably be 100:1 to 5 by weight in consideration of the curing speed, hardness and the like.

The second liquid comprises a persulfate compound, phosphate and water, and as the persulfate compound, which is a polymerization catalyst, a hydrate of as ammonium persulfate, potassium persulfate, or sodium persulfate may be used. In addition, the phosphate is used as a stabilizer, and water is used as a solvent. At this time, the mixing ratio is 1 to 10% by weight of the persulfate compound, 1 to 2% by weight of the phosphate, and the balance of water.

In addition, the first liquid and the second liquid are mixed and injected in a weight ratio of 1:0.5 to 1 in consideration of curing speed, hardness, durability and the like.

In addition, the first liquid may further comprise duck down powder, and the duck down powder may be dried and pulverized in the same manner as the surface material, or may be in a coated state. At this time, the first liquid may consist of 0.1 to 1% by weight of the duck down powder and the balance of the crosslinked product.

When the two-liquid type acrylic injection material configured as described above is applied, the curing rate is delayed so that the entire crack site may be filled, and the injection material may be applied to microcracks and provide more excellent waterproofness, durability, and crack follow-up performance.

In the above, the present invention has been described through specific examples, but various and modified configurations are possible by those skilled in the art by referring to and combining various features described in the present specification. Therefore, the scope of the present invention should not be limited only to the described embodiments, but should be construed by the appended claims.

The invention claimed is:

1. A waterproofing method using an acrylic injection material, the method comprising:
confirming a crack site in a roof slab;
forming one or more injection holes from an upper part of the confirmed crack site;
installing packers in the injection holes;
filling the crack site by injecting a two-liquid type acrylic injection material into the packers installed in the injection holes;
removing the installed packers;

applying an acrylic putty material to the crack site from which the packer has been removed, and applying a surface material to the entire slab in which the crack site is waterproofed, wherein the surface material comprises alkoxysilanes, colloidal silica, formic acid, isopropyl alcohol, duck down powder, carbon white and guanidine phosphate.

2. A waterproofing method using an acrylic injection material, the method comprising:

confirming a crack site on a roof slab;

forming one or more injection holes from an upper part of the confirmed crack site;

installing packers in the injection holes;

filling the crack site by injecting a two-liquid type acrylic injection material into the packers installed in the injection holes;

removing the installed packers; and applying an acrylic putty material to the crack site from which the packers have been removed, wherein the two-liquid type acrylic injection material consists of a first liquid containing a crosslinked product prepared by crosslinking acrylic acid metal salts with a non-expandable epoxy acrylate resin, and a second liquid containing a persulfate compound, phosphate, and water, wherein the first liquid and the second liquid are mixed and injected at a ratio of 1:0.5 to 1 by weight, and wherein first liquid further comprises duck down powder.

* * * * *